United States Patent
Weichel

[15] 3,696,598
[45] Oct. 10, 1972

[54] APPARATUS FOR COLLECTING CROPS

[72] Inventor: Ernst Weichel, Bahnhofstr. 1, 7326 Heiningen, Germany

[22] Filed: April 17, 1969

[21] Appl. No.: 817,626

[30] Foreign Application Priority Data

April 19, 1968 Germany..........P 17 57 270.2

[52] U.S. Cl. .....................56/364, 56/192, 56/13.9, 56/500
[51] Int. Cl. ............................................A01d 89/00
[58] Field of Search..........56/23, 344, 364, 500–504, 56/192, 219–227, 370, 372, 341, 342, 343, 354, 355, 356, 357, 344, 345, 341, 342

[56] References Cited

UNITED STATES PATENTS

| | | | |
|---|---|---|---|
| 58,702 | 10/1866 | Whiting | 56/192 X |
| 1,334,933 | 3/1920 | Hamilton | 56/219 |
| 2,636,335 | 4/1953 | Whitney | 56/370 |
| 2,643,754 | 6/1953 | Doak | 56/328 R X |
| 2,817,944 | 12/1957 | Callum | 56/341 |
| 2,842,045 | 7/1958 | Bornzin | 56/341 X |
| 2,850,863 | 9/1958 | Pierson | 56/192 |
| 2,910,819 | 11/1959 | Helliwell | 56/220 |
| 3,040,508 | 6/1962 | Nolt et al. | 56/341 |
| 3,132,459 | 5/1964 | Grillot | 56/341 |
| 3,319,408 | 5/1967 | Landwehr | 56/220 |
| 2,757,602 | 8/1956 | Nolt | 56/341 |
| 2,835,101 | 5/1958 | Morrison | 56/341 |
| 2,836,027 | 5/1958 | Pearson | 56/158 |
| 3,153,890 | 10/1964 | Harrington | 56/341 |
| 3,517,609 | 6/1970 | Smith | 45/341 X |

FOREIGN PATENTS OR APPLICATIONS

| | | | |
|---|---|---|---|
| 652,455 | 11/1937 | Germany | 56/192 |
| 565,502 | 7/1957 | Italy | 56/192 |
| 1,425,753 | 12/1965 | France | 56/364 |
| 69,990 | 2/1946 | Norway | 56/192 |
| 585,724 | 10/1959 | Canada | 56/364 |

*Primary Examiner*—Russell R. Kinsey
*Attorney*—McGlew and Toren

[57] ABSTRACT

A device for collecting crops includes means collecting the crops from the ground and conveying them during the movement of the collecting device over the ground, in a direction substantially transverse to the traveling direction. The crop is compressed immediately after it is collected and conveyed during its compression in the transverse direction. A conveying duct is oriented behind a collecting drum which is adapted to be positioned adjacent the ground. The conveying duct widens in a conveying direction in the manner of a wedge and conveyor means are arranged to run in a direction transverse to the collecting drum to move the collected crop along the conveying duct and to transfer it, for example, into a receiving truck. The outlet port for the conveying duct is arranged laterally next to and behind the collecting drum. The collecting drum may be advantageously mounted on a pivotal arm which may also telescopic so that it may be positioned directly adjacent the entrance to the collecting duct and operated, for example, in conjunction with a mower. The collecting duct itself advantageously includes baffle plates or wall elements which may be pivoted to accommodate the feeding to a selected orientation and size for facilitating the feeding to a collecting truck.

25 Claims, 28 Drawing Figures

INVENTOR
ERNST WEICHEL

BY
McGlew & Toren
ATTORNEYS

INVENTOR
ERNST WEICHEL

BY

McGlew & Toren
ATTORNEYS

INVENTOR
ERNST WEICHEL
BY
McGlew & Toren
ATTORNEYS

INVENTOR
ERNST WEICHEL

BY
McGlew & Toren
ATTORNEYS

INVENTOR
ERNST WEICHEL

BY

McGlew & Toren
ATTORNEYS

APPARATUS FOR COLLECTING CROPS

SUMMARY OF THE INVENTION

This invention relates in general to the construction of agricultural machinery and to a method of collecting crops and in particular, to a new and useful apparatus for collecting crops and conveying them in a transverse direction while the crop is subjected to a compression.

Methods and devices for collecting crops and conveying them laterally next to a tractor are known. The known devices of this type have the disadvantages that heavy and bulky implements are required and they involve a high expenditure for their manufacture and they can only be transported along the road in a very cumbersome way. In addition the known devices require considerable preparation time for orienting the implement in the operating position and for shifting it to the transporting position or vice versa. In addition the known devices are only suitable for mowing or collecting the crop and they may not be used alternately for mowing or collecting because a very time consuming changeover of the device is first required between such shift in operations.

In accordance with the present invention there is provided a device that can harvest and collect laterally and deliver into a laterally positioned collecting truck or carriage and which may be arranged to deliver laterally in respect to the pulling tractor. In addition the construction is such that a precompression of the crop is effected during its loading into a receiving truck and as the crop is being moved transversely to the ground movement direction. In accordance with the invention the crop is conveyed, immediately after being picked up or collected by a collecting drum, in a lateral direction and a conveying element engages the crop in a manner to compress it as it is moved transversely. The compression and movement is increased by the constant pick up of additional crop material. Preferably, the operation is carried out in a manner such that the compressed material is first conveyed positively and then subsequently indirectly by the pushing effect of the following positively conveyed material. In this manner the crop can be harvested and collected at a rate comparable to the operation of a loading truck and the compression of the crop material increases the capacity of the loading truck.

A device embodying the invention is characterized by the construction of a closed conveyor duct which extends transversely to the driving and pick up direction. A pick up drum or collecting implement is arranged adjacent the inlet port and extends over its entire length and conveyor means are arranged to act transversely to the pick up direction at least in the range of one duct wall which extends transversely or obliquely to the driving direction. The construction is such that there is a compression of the material in a direction transverse to the driving direction and this has the advantage that the same amount of material can be conveyed in a much smaller device and the conveyor means which effects the conveyance may be arranged in only one duct wall. The duct is arranged to connect directly into a loading truck and the precompressed material is fed directly into the truck so that the loading space of the truck is utilized to a far greater extent.

Another advantage of the invention is that the compressed material which issues from the transverse conveyor duct which is arranged laterally behind the collecting element can be conveyed in the range below the loading truck without additional conveyor means and under the power of the material which is being collected. The apparatus can be very small, particularly very low in height, since the conveyor means requires very little space for the installation. The apparatus may also be lifted into a vertical position to align behind the total outline of the loading truck in the same manner as the generally known tractor mowers.

The device of the invention permits collection of the material which lies on the ground, the mowing of cereal and leaf vegetables and their conveyance transversely without touching the ground, or the collection of the materials after mowing. It is not necessary to prepare the implement by time consuming measures.

An object of the invention is to provide an improved crop collecting device which includes a crop collecting element such as a drum which is adapted to be moved along the ground and a conveyor chute arranged behind the collector and having conveyor means for compressing and moving the crop which is collected transversely to the collecting direction.

A further object of the invention is to provide a crop collecting device which is of relatively low height and which may be used along side of a tractor and arranged to collect and compress the crop and deliver it laterally into a loading truck.

A further object of the invention is to provide a crop collecting device which is simple in design, rugged in construction and economical to manufacture.

The various features of novelty which characterize the invention are pointed out with particularity in the claims annexed to and forming a part of this specification.

For a better understanding of the invention, its operating advantages and specific objects attained by its use, reference should be had to the accompanying drawings and descriptive matter in which there are illustrated and described preferred embodiments of the invention.

GENERAL DESCRIPTION OF THE PREFERRED EMBODIMENTS

Figure 1:
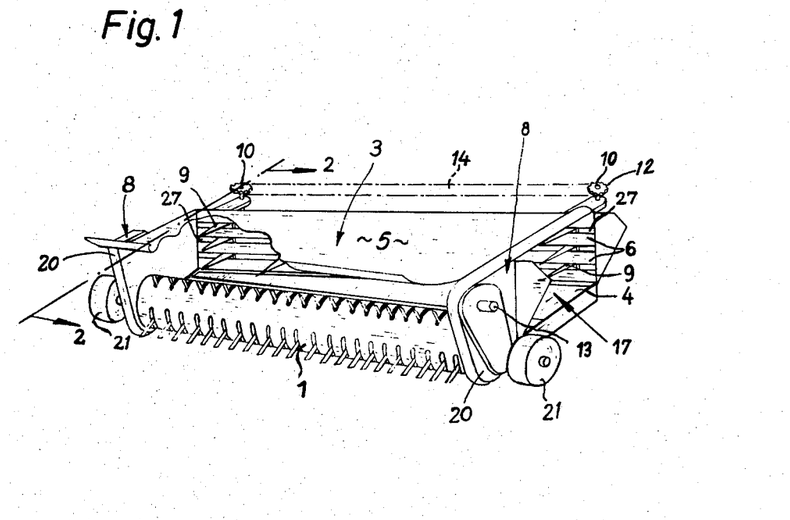
FIG. 1 is a rear delivery side perspective view of a crop collecting device constructed in accordance with the invention.
Figure 2:
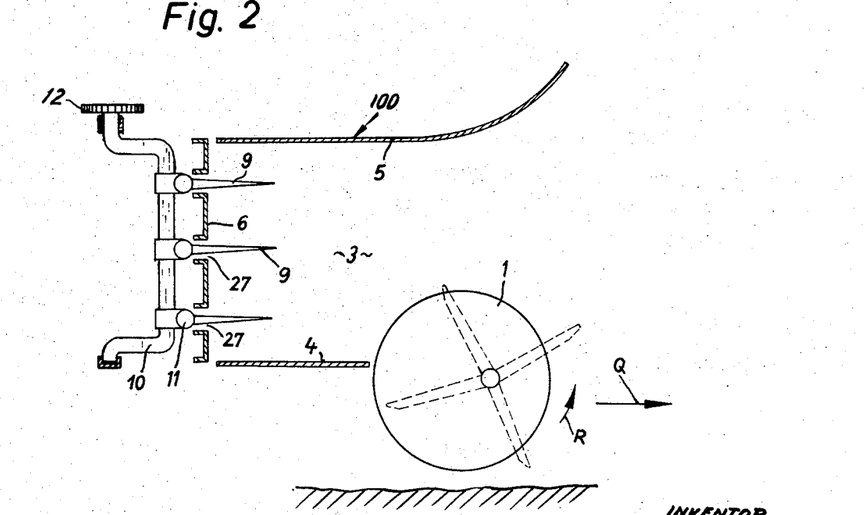
FIG. 2 is an enlarged section taken along the line 2—2 of FIG. 1.
Figure 28:
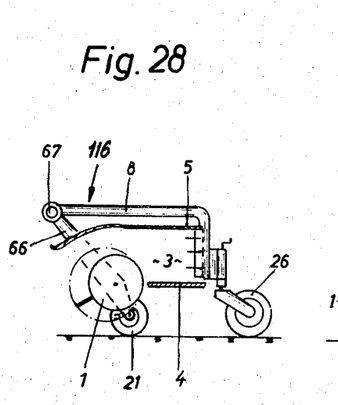
FIG. 28 is a view similar to FIG. 3 of still another embodiment of the invention.

Referring to the drawings in particular, the invention, as embodied in FIGS. 1 and 2, comprises a crop collecting device generally designated 100 which includes a pick up and/or collecting drum 1 supported on wheels 21, which is adapted to be moved along the ground by means such as a pulling tractor to collect a crop. In accordance with the invention the drum 1 is rotatably mounted on a supporting frame including side parts 20 and it is connected, on the side opposite to the driving direction, to a conveyor duct 3 having a bottom 4, a roof 5 and a rear wall 6. The conveyor duct 3 has an outlet port 17 which is located on one side of the device and more clearly illustrated in FIGS. 9 and 19 of the device. Although not shown in FIGS. 1 and 2, a mower may be arranged in front of and beneath drum 1, as indicated at 7 in the embodiments of the invention shown in FIGS. 3, 9 and 19. Also, all of the parts are mounted on a known frame construction generally indicated at 8, and the frame construction 8 may be mounted on wheels 26, as indicated in FIG. 28.

In accordance with a feature of the construction, conveyor means are associated with rear wall 6 and they comprise conveyor prongs 9 which protrude through slots 27 in this wall and which move from the closed end of the conveyor duct toward the discharge opening 17. The conveyor prongs 9 are arranged on push rods 11 which rotate about crank shafts 10. The crank shafts 10 rotate to move the prongs 9 into the duct 3 and in the direction of the opening 17 and then outwardly therefrom through the slots 27. The crank shafts 10, which are arranged at respective ends of the collecting duct 3, may be connected together by a driving chain 14 which is driven by a gear 12 and drive shaft 13. The drive is also in operative connection with the collecting drum 1 and it advantageously receives power from a known driving connection which is provided on a pulling tractor (not shown). A connecting chain 14 is indispensible when crank shafts with several offsets are employed.

The method of operation of the device is as follows:

When driving over the field in the direction of the arrow Q shown in FIG. 2, the material is received by the collecting and/or pickup drum 1 and it is fed in the direction of the arrow R into the duct 3 which is arranged behind the collecting and/or pickup drum. In the duct 3 the material is pushed by the material which is constantly supplied by the collecting and/or pickup drum and also by the prongs 9 of the conveying means and moved along the rear wall toward the opening 17. The conveyor prongs 9 working in the range of the rear wall 6 dip into the constantly building material and push it in the direction of the outlet port 17 by an amount corresponding to the effective conveyor stroke. The greater the density of the material line, the more material will be pressed against the conveyor prongs and the more reliable will be the operation of the conveyor prongs 9 to convey the entire material line constantly in the direction of the outlet port 17 arranged behind the lateral boundary of the drum 1, even though they dip into the conveyor duct and into the material line by relatively small amounts. Since the conveyor duct 3 widens toward the outlet port 17 in the manner of a wedge, additional material finds room only after every conveyor stroke of the prongs 9. The duct 3 is constantly widened to the extent of the material feed which is added to the line.

Though the collecting and/or pickup drum 1 can only push the material in the direction opposite to the driving direction, it enhances the action of the conveyor prongs 9 working in a direction transverse thereto in a very unexpected manner so that the conveyor prongs 9 may be relatively short relative to the depth of the conveyor duct. By suitable selection or regulation of the conveyor speed of the prongs 9 the material can always be conveyed through the outlet port 17 at least to the extent additional material is constantly fed by the collecting drum 1 to the conveyor duct 3. The crop material is fed as a compressed material line through the discharge port 17 and is conducted to a guide tank or guide trough of any selected form for additional conveying to and through a loading truck, for example.

Since it is not necessary in most cases to provide additional conveyor means in the range of the roof of the conveyor duct or the bottom, the duct can be made very flat or arranged so low, for example, at a location directly on the ground, that a mower can be arranged directly in front of the duct bottom. Such an arrangement is indicated in the embodiment of FIGS. 3 and 4, in which, also, the collecting drum can function as an elevator means for pulling in the mowed material provided it is arranged above the duct bottom and the direction of rotation of the collecting drum is made reversible.

Figure 3:
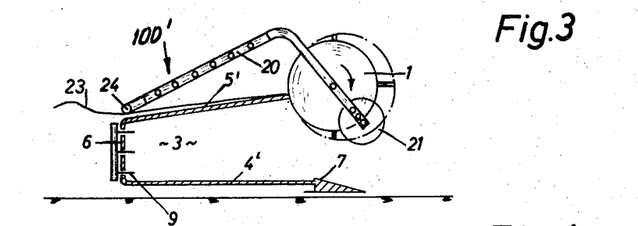
FIG. 3 is a view similar to FIG. 2 of another embodiment of the device.
Figure 4:
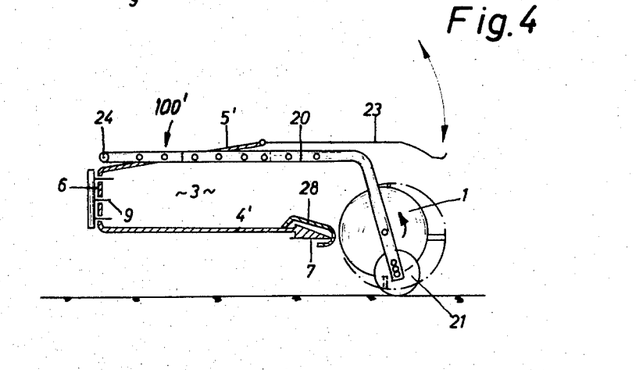
FIG. 4 is a view similar to FIG. 3 with the parts shown in another operating position.

The embodiment shown in FIGS. 3 and 4 includes a collecting device 100' which has parts corresponding to those shown in the device of FIGS. 1 and 2, with the corresponding parts being indicated by the same reference numerals primed. In this embodiment, however, the drum 1 is arranged on a telescopic swivel arm 20 which is articulated on a fulcrum or pivot 24 supported in the supporting frame. The fulcrum is arranged approximately at the level of the roof 5'. The collecting drum 1 can be switched in a simple manner from the position in which it is elevated, as indicated in FIG. 3, to the position as a collecting and/or pickup drum, shown in FIG. 4.

The arm 20 can be supported by sensing wheels 21 which are preferably adjustable in height. Since the conveyor duct 3 is arranged on a frame 8 having adjustable wheels such as the wheels 26 of FIG. 28, its bottom 4' can bear as indicated in FIG. 3 in the "mow" position approximately on the ground surface. In addition it can be arranged in the "collect" position at a distance above the ground surface. In the latter position the mower 7 is not required and therefore it is covered by a hood 28. The swivel arm 20 is angularly curved so that it does not come to lie in any of its positions in front of the lateral outlet port 17. The front part of the duct roof 5' can be designed as a swivel baffle 23, and this is extended only required in the "collect" position of FIG. 4 and it is folded back in the "mow" position of FIG. 3.

Figure 5:
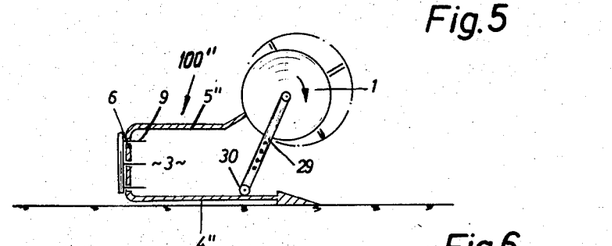
FIG. 5 is a view similar to FIG. 3 of still another embodiment of the device.
Figure 6:
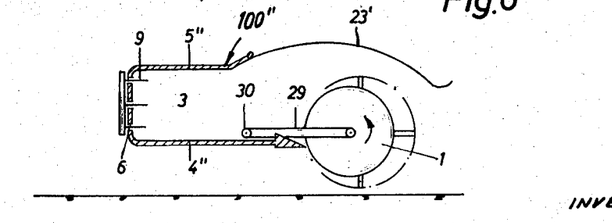
FIG. 6 is a view of the embodiment shown in FIG. 5 with the collecting drum in another operative position.

In the embodiment indicated in FIGS. 5 and 6 there is shown a crop collecting device generally designated 100" which also includes a pivoted baffle 23'. However, this embodiment differs from that of FIGS. 3 and 4 in respect to the construction of the swivel arm 29 which is secured to a pivot 30 of the frame adjacent the bottom 4" of the duct 3 having roof 5". This arrangement also permits the orientation of the collecting drum 1 into a position for collection or for mowing. Advantageously, mower 7 may be so mounted that it may be swung rearwardly and downwardly and locked in a retracted position when it is not in use.

Figure 7:
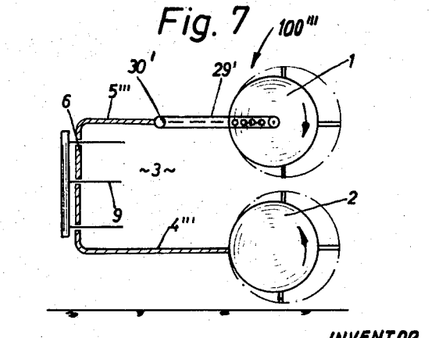
FIG. 7 is a view similar to FIG. 3 of still another embodiment of the device.

In the embodiment shown in FIG. 7 two oppositely driven collecting drums 1 and 2 are employed in a crop collecting device generally designated 100'''. In this way it is possible to use a duct, with a bottom 4''' and a roof 5''', having a very great inside width but with collecting drums 1 and 2 of relatively small diameter. The drum 1 is advantageously supported on a swivel arm 29' so that it can turned about the fulcrum 30' or adjusted.

Figure 8:
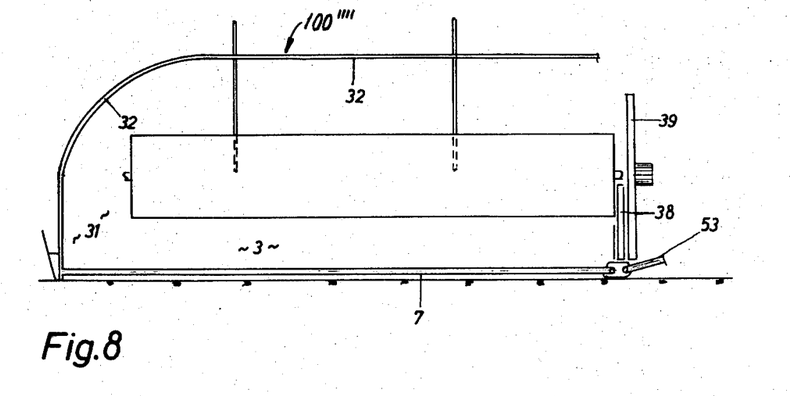
FIG. 8 is a rear elevational view of still another embodiment of the invention.
Figure 9:
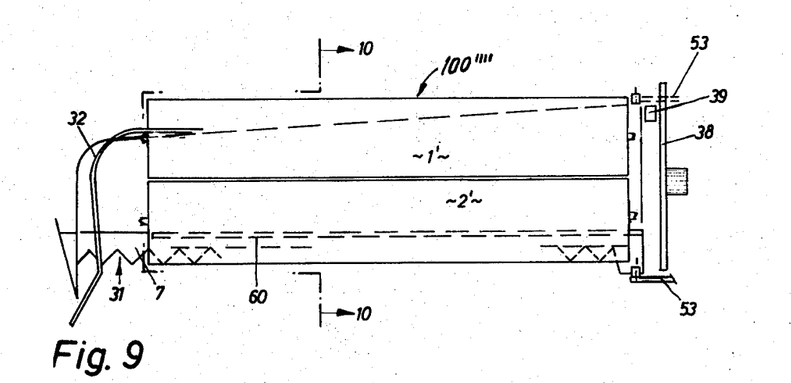
FIG. 9 is a top view of the device indicated in FIG. 8.
Figure 10:
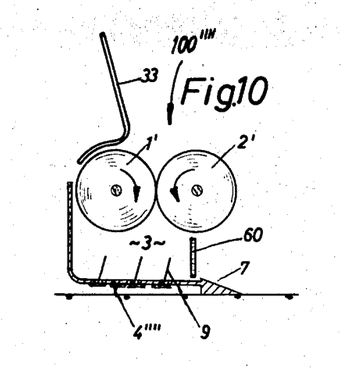
FIG. 10 is a section taken along the line 10—10 of FIG. 9.

In the embodiment shown in FIGS. 8 to 10 there is a crop collector generally designated 100'''' which is particularly suitable for the collection and transverse conveyance of very long stemmed crops such as corn, grain, sugar cane, etc. If the material stands in rows like rice, for example, it can be cut at the location 31 with a part of the effective working width of a mower 7. Subsequently, it is deflected by slide 32 into a transverse direction so that the long stalks can fall over the length of the collecting drums 1' and 2' and can be pulled at their bottoms into the transverse conveyor duct 3. It is advisable to make the front drum movable relative to the rear drum. The conveyor prongs 9 are, in the arrangement shown, preferably provided in the bottom wall 4''''. The duct 3 can be partly closed at the front by a wall 60.

Since corn stalks are deposited in the duct only in a transverse direction, they can be cut uniformly by an additional cutting device, for example, having rotating blades 38 and blades 39, which is arranged adjacent the opening or discharge 17. Since all of the parts of a corn plant will be located inside the duct after collecting, there is no danger that any cobs will fall off the plant and be lost on the ground. As shown in FIG. 10 if the slide 32 is replaced by a slide wall 33, even standard grain can be mown over the entire working width of the mower 7 and deposited on the collecting drums 1' and 2'. The drums 1' and 2' pull the grain subsequently between the drum diameters and convey it without grain loss into the duct. The truck used for collecting mown crops thus can also be used for collecting the grain harvest, particularly in farms which do not plant too much grain.

Figure 11:
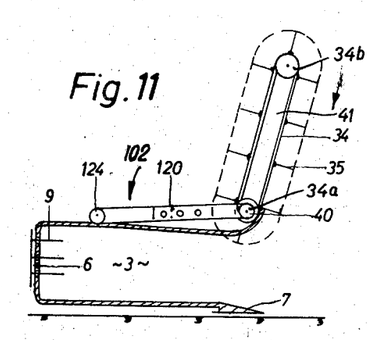
FIG. 11 is a view similar to FIG. 3 of still another embodiment of the invention.
Figure 12:
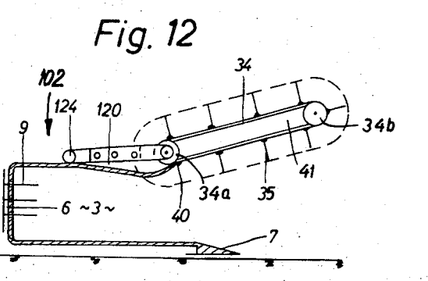
FIG. 12 is a view of the embodiment indicated in FIG. 11 with the parts indicated in a shifted position.

FIGS. 11 and 12 illustrate an embodiment of the invention including a crop collector 102 mounted on an arm 120 which is adjustable in length, or telescopic, and is pivotally mounted at one end on a pivot 124 supported on the main supporting frame. An arm 41 is pivoted at 40 to the free end of arm 120. This embodiment of the invention includes a collecting means in the form of a prong band 34 which is trained over rollers 34a, at the pivot 40, and 34b, at the outer or free end of arm 41. Prong band 34 has conveyor prongs 35 which may be so oriented as to convey higher material, in the direction of the arrow, downwardly and then rearwardly into duct 3. Such a prong band 34 can also be used in addition to a collecting drum such as shown in FIGS. 1 and 7. As illustrated by the two positions shown, respectively, in FIGS. 11 and 12, prong band 34 can be swung about pivot or fulcrum 124 and about pivot or fulcrum 40, and can be locked in different inclined positions and also at different distances from rear wall 6. This permits adaptation of the device to two crops of different height and to different driving speeds and different amounts of crop deliverys.

Figure 13:
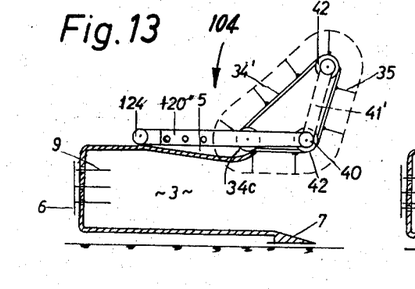
FIG. 13 is a view similar to FIG. 3 of still another embodiment of the invention.
Figure 14:
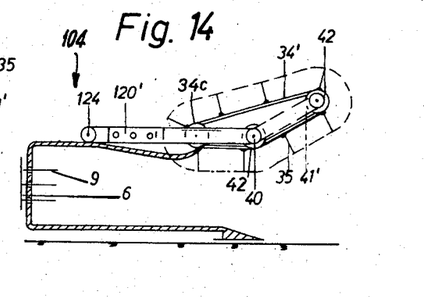
FIG. 14 is a view of the apparatus shown in FIG. 13 with the parts indicated in a shifted position.

In FIGS. 13 and 14, in which the mounting of the prong band is essentially similar to the arrangement shown in FIGS. 11 and 12, a third roller 34c is rotatably mounted on the arm 120' which is adjustable in length and supported at the pivot 124 on the main support frame, so that prong band 34' is trained around three rollers. The crop collector is generally designated at 104 as including prong band 34', which latter has its prongs 35 operating in the range directly in front of duct 3 and parallel to the bottom and the roof of the duct, so that a greater compression of the material in the transverse conveyor duct 3 is possible. In the embodiment of FIGS. 13 and 14, the arm 41', corresponding to the arm 40, carries rollers 42 at each end, and is again angularly adjustable about the pivot 40. In addition, although not shown in FIGS. 13 and 14 in a specific manner, arm 41' is adjustable in length or is telescopic.

Figure 15:
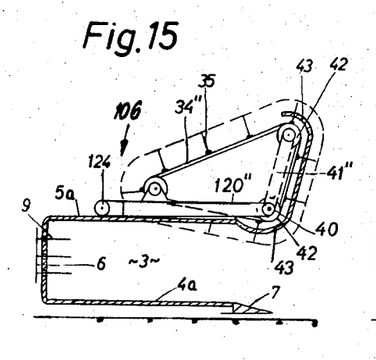
FIG. 15 is a view similar to FIG. 3 of still another embodiment of the invention.
Figure 16:
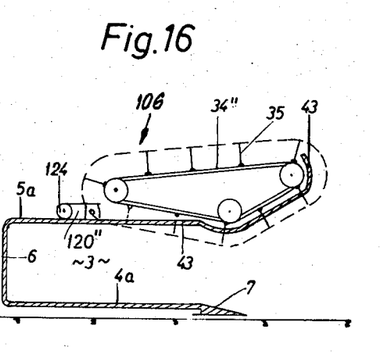
FIG. 16 is a view similar to FIG. 15 with the part shown in a shifted position.

In the embodiment of the invention shown in FIGS. 15 and 16, prong band 34" of a collector generally indicated at 106 is again trained over three rollers supported in essentially the same manner as described for FIGS. 13 and 14 on arms 120" and 41" pivotally interconnected at the pivot 40, with arm 120" again being supported on pivot 124 in turn supported on the main supporting frame. In this embodiment of the invention, the roof 5a of the duct having a floor 4a is extended and is designed as a stripping grate 43 for collector 106. In this construction, the prongs 35 can pull out of the fed material without squeezing, even when the material is compressed in duct 3.

Figure 17:
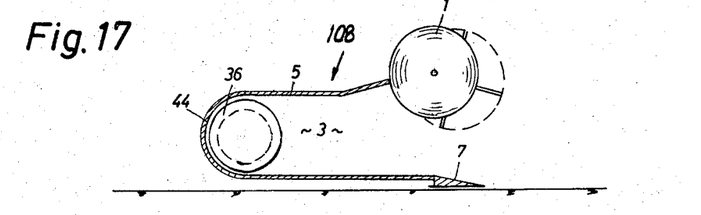
FIG. 17 is a view similar to FIG. 3 of another embodiment of the invention.

In FIG 17 there is provided a collecting device generally designated 108 which includes a conveyor screw 36 which is located in the range of the rounded rear wall 44 of the conveyor duct 3. The conveyor screw 36 compresses the material along with the action of the collecting drum 1 and conveys it continuously in a direction of the outlet port 17 of the duct 3.

Figure 18:
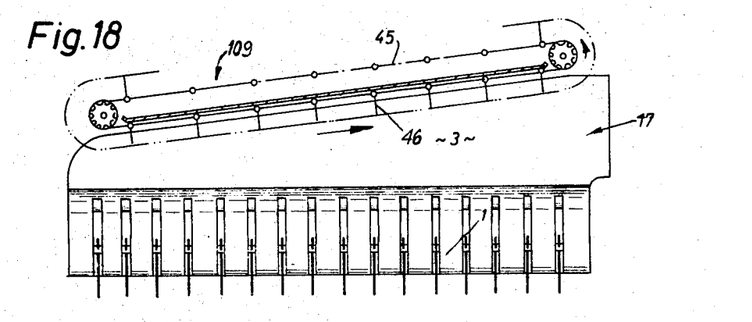
FIG. 18 is a horizontal section through another embodiment of the invention.

As indicated in FIG. 18 known conveyor chains 45, with prongs 46, revolving about vertical shafts can be arranged in the duct 3 instead of the conveyor screw 36 or the push rods 11. A collecting device 109 which is indicated in FIG. 18 may also employ conveyor belts or carrier bars (not represented). Such devices are particularly suitable for higher conveyor speeds and low pressure.

Figure 19:
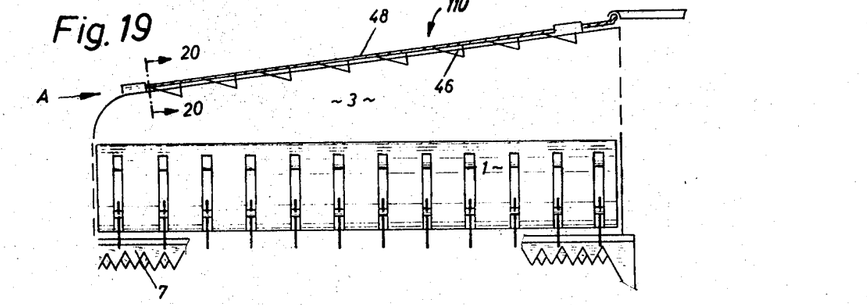
FIG. 19 is a horizontal section of still a further embodiment of the invention.
Figure 20:
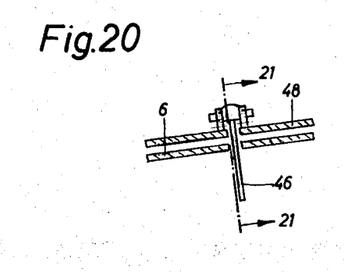
FIG. 20 is a section taken on the line 20—20 of FIG. 19 and on an enlarged scale.
Figure 21:
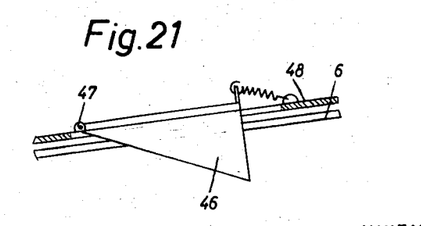
FIG. 21 is a section taken along the line 21—21 of FIG. 20.

In the embodiment indicated in FIGS. 19 to 21, there is shown a collecting device 110 having a reciprocable conveyor with triangular prongs 46 which are reciprocated by push elements 48. The prongs 46 can be pivoted or folded about pivots 47 so that they can dip into the material only in a conveying direction, and can be folded back into an inoperative position during the idle stroke.

Figures 22, 23:
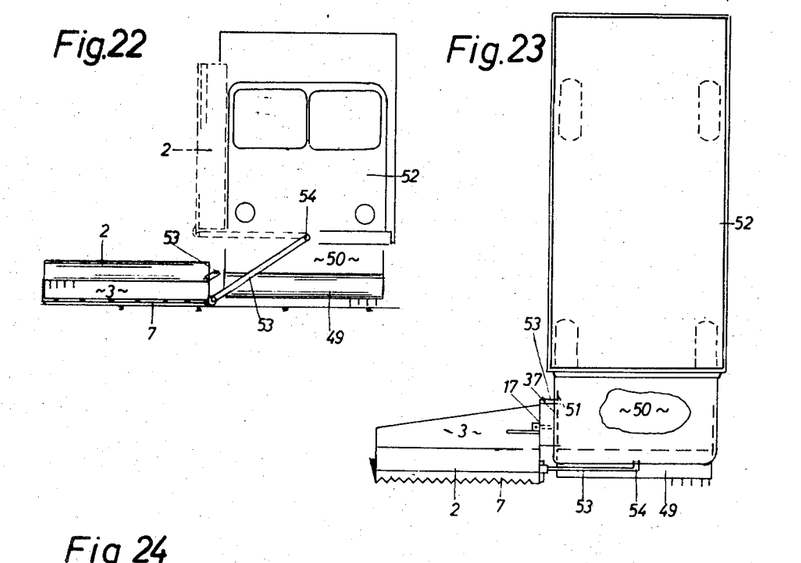
FIG. 22 is a schematic front view of another embodiment of the invention.
FIG. 23 is a top view of the device shown in FIG. 22.

In the embodiment of the invention shown in FIGS. 22 and 23, the harvesting device is mounted on an automotive truck 52, and is suitable, without any change, either for collecting the material directly from the collecting device or for lateral mowing and collection of the material. In the collecting operation the conveyor duct 50 of the loading truck is charged through the collecting drum 49. During the mowing and collection, the conveyor duct can be charged from the side through an opening 37 in the side wall 51 of the duct 50. This is arranged inwardly of the collecting drum 49 and adjoins the outlet port 17. The arrangement of a so-called push collecting drum 49 on the loading truck is advisable. The mower 7, with the collecting drum 2 in the conveyor duct 3, is supported on laterally projecting arms 53 which, in turn, are pivotally supported on joints 54. As indicated in FIG. 22, in broken lines the harvester can be folded up in a vertical position by means of a lifting device, not represented. The above described device is suitable for collecting and conveying cereals and leaf vegetables to a loading truck and also for carrying out numerous other agricultural operations.

The device of the invention can be designed as a separate trailer for tractors and can be used for the lateral displacement and compression of cereals and leaf vegetables which are mown next to the track of the tractor or which are already on the ground. By providing elements for the further treatment of the crop, for example, such as knives, presses, carrying devices, squeeze rolls, breaking elements, etc., behind the outlet port 17, an extremely simple, light weight and inexpensive machine can be produced.

Another advantageous field of application of the method and apparatus results from the use of the device as a feeding device for existing stationary processing machines such as blast choppers, presses, briquetting machines, threshers, conveying devices, etc. It is of a particular advantage in such arrangements that the material can be fed through the collecting device both intermittently and continuously and the material may be introduced without trouble and with safety by the collecting drums 1 and 2 into the duct. The apparatus makes it possible to deliver the material to the following machinery in the form of a uniform line of material feed which has relatively small dimensions.

Other known conveyor systems, for example, conveyor drums with rigid prongs and stripping grates or conveyor drums with elastic prongs and stripping grates or conveyor drums with controlled prongs, for example, so-called conveyor rockers, can be used instead of a collecting drum or a prong band if desired.

Another field of application of the invention is provided by use of the device as a discharge device for cereals and leaf vegetables which are stored or delivered into heaps, for example, as a discharge device for silage. A correspondingly modified device is also suitable for discharging and conveying compost which may be deposited in heaps, for example to a loading device.

Figure 24:
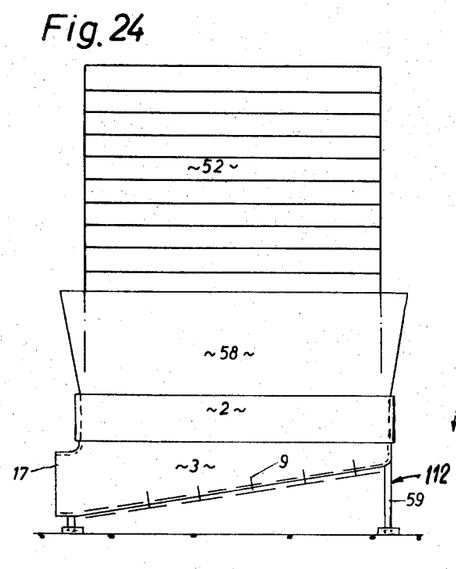
FIG. 24 is a schematic front elevational view of still another embodiment of the invention.
Figure 25:
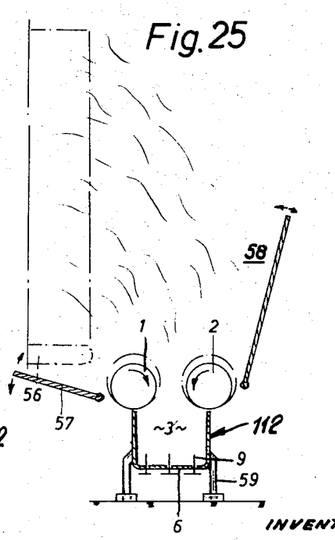
FIG. 25 is a partial section through the embodiment indicated in FIG. 24.

As an example for the application of the invention to other arrangements, there is shown in FIGS. 24 and 25 a conveying device generally designated 112 which may be used as the feed from a truck having a scraper bottom. On the discharge side of the truck 52 having a scraper bottom 56, there is arranged a chute 57 which terminates above collecting drums 1 and 2 of the collecting device 112. The conveyor duct 3 is turned by 90° in contrast to the other embodiments described herein, that is, drums 1 and 2 and the inlet are directed upwardly in rear wall 6 and its conveyor means are now at the bottom, to form an upwardly opening conveyor duct 3.

On the side of the device remote from the loading truck 52 is arranged an adjustable limiting wall 58 which prevents the material form dropping to the rear. The collecting device is supported on the base 59 or is arranged on the small wheeled vehicle. If the loading truck is discharged by means of scraper bottom 56, the partly continuous stalk material drops in a deep heap into the inlet of the chute 57, 58 and onto the collecting drums 1 and 2. The prongs of the collecting drum move the material constantly from the heap and force it into the duct. Conveyor means are associated with the wall 6 and convey the material obliquely downwardly in a thickening line to the outlet port 17 which is arranged next to a receiving means. Known devices, such as choppers, conveyors etc., may be included in the receiving means. The device requires little space and can be produced with little expenditure.

In a relatively simple manner the device can be turned by 90° to a position corresponding to that represented in FIGS. 1 to 23, for example, and with a limiting wall arranged behind the upper drum 1, which, of course, may be portable or pivoted on a fulcrum so that it can be moved or pivoted toward a heap deposited on the ground during the discharge. In this way it is also possible without a loading truck to remove the material, which is stored in a heap form, constantly from the heap and to feed it to a following conveying device.

Figure 26:
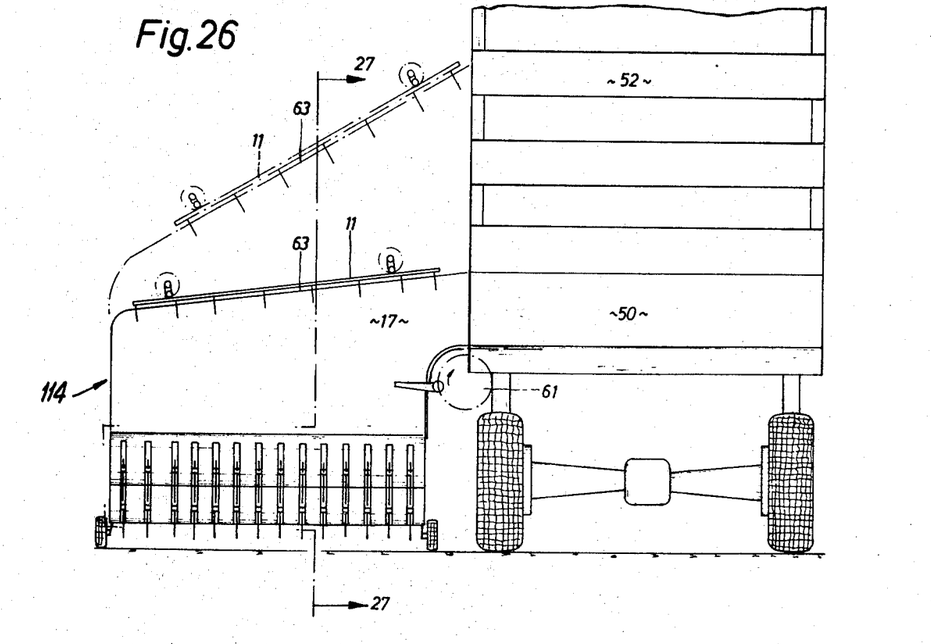
FIG. 26 is a schematic front view of still embodiment of the invention.
Figure 27:
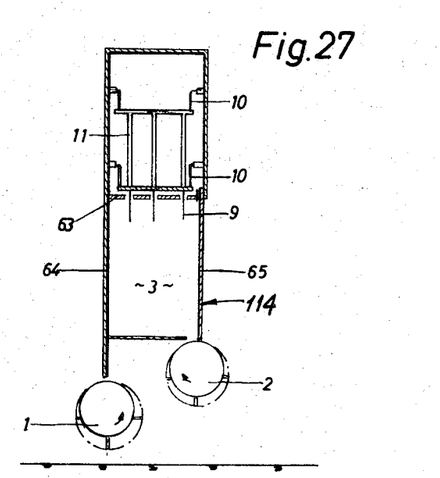
FIG. 27 is a section taken along the line 27—27 of FIG. 26.

In the embodiment represented in FIGS. 26 and 27, there is provided a device generally designated 114, for feeding to a loading truck 52 and which may, for example, be located at the front or rear end of a scraper bottom of truck 52. It can be seen, particularly from FIG. 27 that the wall 64 is located directly adjacent the collecting drum 1 and the wall 65 is located adjacent the collecting drum 2 which is arranged well above the ground level. The wall 63, through which the conveyor prongs pass, forms the top cover of the duct 3 and it rises toward the loading truck. The collecting drums 1 and 2 are advantageously made vertically adjustable along with the wall 64 and 65 in order to accommodate the device to the ground or collecting conditions.

The material is pushed upwardly along the duct 3, after it impinges on the conveyor prongs 9, to the outlet port 17 which is arranged at an upper level and which feeds into a loading duct 50 arranged at substantially the level of a scraper bottom of the loading truck 52. An additional conveyor device 61 can be provided on the harvester or the loading truck in the range of the outlet port 17 and this enhances the passage of the material from the vertical to the horizontal conveying direction in the loading truck.

The harvester represented in FIGS. 26 and 27 can be relatively narrow and can be arranged to work with only one collecting drum 1. In such case it is advisable to reduce the inside width of the duct 3 between the walls 64 and 65 and to extend the lower end of the wall 65 downwardly and to advance it if necessary.

FIG. 28 shows a collecting device generally designated 116, and illustrates how collecting drum 1 is supported on swivel arms 66 which are mounted for limited pivotal movement about pivot 67. The collecting drum 1 is thus suspended in a lagging position and the drum can adapt itself to the unevenness of the ground.

What is claimed is:

1. A collecting device for agricultural material comprising a collecting duct having a receiving opening, a side delivery opening extending transversely to the receiving opening and a wall opposite to the receiving opening, collecting means located adjacent the receiving opening for collecting the material and delivering the material into said duct, and conveying means associated with the wall of said duct opposite the receiving opening for moving the material which has been delivered into said duct transversely to the receiving opening and the receiving direction and laterally through the delivery opening of said duct; said duct including a roof portion having a baffle plate which is pivotally mounted for changing the upward slope of said roof portion.

2. A collecting device for agricultural material comprising a collecting duct having a receiving opening, a side delivery opening extending transversely to the receiving opening and a wall opposite to the receiving opening, collecting means located adjacent the receiving opening for collecting the material and delivering the material into said duct, and conveying means associated with the wall of said duct opposite the receiving opening for moving the material which has been delivered into said duct transversely to the receiving opening and the receiving direction and laterally through the delivery opening of said duct; said collecting means comprising a rotatable lower collecting drum and a rotatable upper collecting drum located adjacent said receiving opening adjacent the top and bottom thereof, respectively.

3. A crop collecting device, according to claim 2, including means adjustably mounting at least one of said upper and lower collecting drums.

4. A collecting device, according to claim 3 including means adjustably positioning said upper collecting drum.

5. A collecting device, according to claim 4, wherein said duct extends upwardly from said receiving opening, said first and second collecting drums being arranged above said receiving opening and defining a nip therebetween.

6. A collecting device for agricultural material comprising a collecting duct having a receiving opening, a side delivery opening extending transversely to the receiving opening and a wall opposite to the receiving opening, collecting means located adjacent the receiving opening for collecting the material and delivering the material into said duct, and conveying means associated with the wall of said duct opposite the receiving opening for moving the material which has been delivered into said duct transversely to the receiving opening and the receiving direction and laterally through the delivery opening of said duct; said conveyor means comprising a plurality of push rods arranged adjacent the rear of said ducts each of said rods having prongs adapted to extend into said duct and means for rotating said rods to move said prongs through said ducts to advance the material along said duct.

7. A collecting device for agricultural material comprising a collecting duct having a receiving opening, a side delivery opening extending transversely to the receiving opening and a wall opposite to the receiving opening, collecting means located adjacent the receiving opening for collecting the material and delivering the material into said duct, and conveying means associated with the wall of said duct opposite the receiving opening for moving the material which has been delivered into said duct transversely to the receiving opening and the receiving direction and laterally through the delivery opening of said duct said collecting means comprising at least two drums; said duct having a wall adjacent said receiving opening which extends substantially vertically.

8. A device for loading a harvested crop into a receiver comprising, in combination, a substantially U-shaped conveyor duct having a bottom wall, a substantially horizontal roof, and an input opening extending the full longitudinal extent of said duct, said input opening being defined by the free edges of said bottom wall and said roof, and being arranged to receive a harvested crop; said duct having a closed end and a discharge opening at the other end to deliver the crop to a receiver; said duct having a normally upright longitudinal rear wall extending between said bottom wall and said roof and disposed in facing spaced relation to said input opening; crop collecting means mounted at said input opening and extending throughout the full longitudinal extent thereof, said collecting means projecting at least partially laterally across said input opening to feed a harvested crop into said duct over the full longitudinal extent of said input opening and toward said rear wall; conveyor means extending substantially perpendicularly through said rear wall into said duct so as to offer minimum resistance to loading of said duct by said collecting means; drive means operable to move said conveyor means longitudinally of said rear wall to effect partial compacting, between said bottom wall, said roof and said rear wall, of the crop located in said duct, and movement of the partially compacted crop along a path defined by said bottom wall, said roof and said rear wall, and partly by said collecting means, and, without change in the direction of travel of the partially compacted crop, through said discharge opening to a receiver; and means mounting said device for movement in a travel direction substantially normal to the longitudinal extent of said input opening.

9. A device, according to claim 8, wherein said duct has a depth extending rearwardly from said input opening which is substantially greater than its height.

10. A device, according to claim 8, wherein said collecting means comprises a rotating drum mounted directly adjacent said input opening.

11. A device, according to claim 8, wherein said collecting means comprises a revolving prong band.

12. A device for loading a harvested crop into a receiver comprising, in combination, a substantially U-shaped conveyor duct having a bottom wall, a substantially horizontal roof, and an input opening extending the full longitudinal extent of said duct, said input opening being defined by the free edges of said bottom wall and said roof, and being arranged to receive a harvested crop; said duct having a closed end and a discharge opening at the other end to deliver the crop to a receiver; said duct having a normally upright longitudinal rear wall extending between said bottom wall and said roof and disposed in facing spaced relation to said input opening; crop collecting means mounted at said input opening and extending throughout the full longitudinal extent thereof, said collecting means projecting at least partially laterally across said input opening to feed a harvested crop into said duct over the full longitudinal extent of said input opening and toward said rear wall; conveyor means extending substantially perpendicularly through said rear wall into said duct so as to offer minimum resistance to loading of said duct by said collecting means; drive means operable to move said conveyor means longitudinally of said rear wall to effect partial compacting, between said bottom wall, said roof and said rear wall, of the crop located in said duct, and movement of the partially compacted crop along a path defined by said bottom wall, said roof and said rear wall, and partly by said collecting means, and, without change in the direction of travel of the partially compacted crop, through said discharge opening to a receiver; and means mounting said device for movement in a travel direction substantially normal to the longitudinal extent of said input opening; said duct widening in a conveying direction in the manner of a wedge.

13. A device for loading a harvested crop into a receiver comprising, in combination, a substantially U-shaped conveyor duct having a bottom wall, a substantially horizontal roof, and an input opening extending the full longitudinal extent of said duct, said input opening being defined by the free edges of said bottom wall and said roof, and being arranged to receive a harvested crop; said duct having a closed end and a discharge opening at the other end to deliver the crop to a receiver; said duct having a normally upright longitudinal rear wall extending between said bottom wall and said roof and disposed in facing spaced relation to said input opening; crop collecting means mounted at said input opening and extending throughout the full longitudinal extent thereof, said collecting means projecting at least partially laterally across said input opening to feed a harvested crop into said duct over the full longitudinal extent of said input opening and toward said rear wall; conveyor means extending substantially perpendicularly through said rear wall into said duct so as to offer minimum resistance to loading of said duct by said collecting means; drive means operable to move said conveyor means longitudinally of said rear wall to effect partial compacting, between said bottom wall, said roof and said rear wall, of the crop located in said duct, and movement of the partially compacted crop along a path defined by said bottom wall, said roof and said rear wall, and partly by said collecting means, and, without change in the direction of travel of the partially compacted crop, through said discharge opening to a receiver; and means mounting said device for movement in a travel direction substantially normal to the longitudinal extent of said input opening; said duct widening gradually toward said delivery opening, said conveying means including a prong conveyor element movable along the rear wall of said duct with its prongs projecting forwardly through said rear wall.

14. A crop device, according to claim 10, including means mounting said drum for positioning said drum adjacent said bottom wall of said duct, for facilitating the infeed of the crop material, and for positioning said drum adjacent said roof of said duct.

15. A collecting device, according to claim 14 in which said collecting drum is rotatable in one direction of rotation when it is located adjacent the bottom wall of said duct for feeding material into said duct and in an opposite direction of rotation where it is located adjacent the roof of said duct.

16. A collecting device, according to claim 15, including a mower, means for mounting said mower adjacent the front edge of said duct when said collecting drum is located adjacent the roof of said duct.

17. A device for loading a harvested crop into a receiver comprising, in combination, a substantially U-shaped conveyor duct having a bottom wall, a substantially horizontal roof, and an input opening extending the full longitudinal extent of said duct, said input opening being defined by the free edges of said bottom wall and said roof, and being arranged to receive a harvested crop; said duct having a closed end and a discharge opening at the other end to deliver the crop to a receiver; said duct having a normally upright longitudinal rear wall extending between said bottom wall and said roof and disposed in facing spaced relation to said input opening; crop collecting means mounted at said input opening and extending throughout the full longitudinal extent thereof, said collecting means projecting at least partially laterally across said input opening to feed a harvested crop into said duct over the full longitudinal extent of said input opening and toward said rear wall; conveyor means extending substantially perpendicularly through said rear wall into said duct so as to offer minimum resistance to loading of said duct by said collecting means; drive means operable to move said conveyor means longitudinally of said rear wall to effect partial compacting, between said bottom wall, said roof and said rear wall, of the crop located in said duct, and movement of the partially compacted crop along a path defined by said bottom wall, said roof and said rear wall, and partly by said collecting means, and, without change in the direction of travel of the partially compacted crop, through said discharge opening to a receiver; and means mounting said device for movement in a travel direction substantially normal to the longitudinal extent of said input opening; said collecting means comprising a rotatable collecting and pickup drum, and means, including a telescopic supporting arm and frame means carrying said duct and pivotally supporting said telescopic supporting arm, mounting said drum in an adjustable position.

18. A device for loading a harvested crop into a receiver comprising, in combination, a substantially channel-shape conveyor duct having a receiving opening extending longitudinally thereof, to receive a harvested crop, and a discharge opening at one end to deliver the crop to a receiver; said duct having a longitudinal wall disposed in facing spaced relation to said receiving opening; crop collecting means mounted at said receiving opening and extending longitudinally thereof to feed a harvested crop into said duct over the full length of said receiving opening and toward said wall; conveyor means extending substantially perpendicularly from said wall into said duct so as to offer minimum resistance to loading of said duct by said collecting means; drive means operable to move said conveyor means longitudinally of said wall to effect partial compacting of the crop loaded in said duct and movement of the partially compacted crop along said wall and through said discharge opening to a receiver; and means mounting said device for movement in a travel direction substantially normal to the longitudinal extent of said receiving opening; said collecting means including upper and lower collecting drums arranged within said receiving opening, a mower blade wider than said upper and lower collecting drums, and a slide wall of arcuate construction extending from one side of said duct across said collecting drums and downwardly in front of said mower.

19. A device, according to claim 11, including a swivel arm pivotally mounting said pronged band and providing for orientation of said band at selected distances from said rear wall of said duct.

20. A collecting device, according to claim 19, wherein said pronged band is mounted for rotation about at least three rollers oriented to move prongs on said band substantially parallel to the bottom wall of said duct and also substantially parallel to the roof of said duct in the range directly in front of said input opening.

21. A collecting device for agricultural material comprising a collecting duct having a receiving opening, a side delivery opening extending transversely to the receiving opening and a wall opposite to the receiving opening, collecting means located adjacent the receiving opening for collecting the material and delivering the material into said duct, and conveying means associated with the wall of said duct opposite the receiving opening for moving the material which has been delivered into said duct transversely to the receiving opening and the receiving direction and laterally through the delivery opening of said duct; said conveyor means comprising a conveyor screw located within said duct adjacent the rear thereof and arranged to feed axially along said screw to said delivery opening.

22. A device for loading a harvested crop into a receiver comprising, in combination, a substantially U-shaped conveyor duct having a bottom wall, a substantially horizontal roof, and an input opening extending the full longitudinal extent of said duct, said input opening being defined by the free edges of said bottom wall and said roof, and being arranged to receive a harvested crop; said duct having a closed end and a discharge opening at the other end to deliver the crop to a receiver; said duct having a normally upright longitudinal rear wall extending between said bottom wall and said roof and disposed in facing spaced relation to said input opening; crop collecting means mounted at said input opening and extending throughout the full longitudinal extent thereof, said collecting means projecting at least partially laterally across said input opening to feed a harvested crop into said duct over the full longitudinal extent of said input opening and toward said rear wall; conveyor means extending substantially perpendicularly through said rear wall into said duct so as to offer minimum resistance to loading of said duct by said collecting means; drive means operable to move said conveyor means longitudinally of said rear wall to effect partial compacting, between said bottom wall, said roof and said rear wall, of the crop located in said duct, and movement of the partially compacted crop along a path defined by said bottom wall, said roof and said rear wall, and partly by said collecting means, and, without change in the direction of travel of the partially compacted crop, through said discharge opening to a receiver; and means mounting said device for movement in a travel direction substantially normal to the longitudinal extent of said input opening; said device further including a loading truck having a loading duct, and means for positioning said conveyor duct adjacent said loading duct in a position in which said discharge opening is connected to said loading duct.

23. A device for loading a harvested crop into a receiver comprising, in combination, a substantially U-shaped conveyor duct having a bottom wall, a substantially horizontal roof, and an input opening extending the full longitudinal extent of said duct, said input opening being defined by the free edges of said bottom wall and said roof, and being arranged to receive a harvested crop; said duct having a closed end and a discharge opening at the other end to deliver the crop to a receiver; said duct having a normally upright longitudinal rear wall extending between said bottom wall and said roof and disposed in facing spaced relation to said input opening; crop collecting means mounted at said input opening and extending throughout the full longitudinal extent thereof, said collecting means projecting at least partially laterally across said input opening to feed a harvested crop into said duct over the full longitudinal extent of said input opening and toward said rear wall; conveyor means extending substantially perpendicularly through said rear wall into said duct so as to offer minimum resistance to loading of said duct by said collecting means; drive means operable to move said conveyor means longitudinally of said rear wall to effect partial compacting, between said bottom wall, said roof and said rear wall, of the crop located in said duct, and movement of the partially compacted crop along a path defined by said bottom wall, said roof and said rear wall, and partly by said collecting means, and, without change in the direction of travel of the partially compacted crop, through said discharge opening to a receiver; and means mounting said device for movement in a travel direction substantially normal to the longitudinal extent of said input opening; said device further including cutting means adjacent said discharge opening for cutting the material advanced along said duct.

24. A collecting device, according to claim 23, including a loading truck said cutting means being carried on said loading truck.

25. A device for loading a harvested crop into a receiver comprising, in combination, a substantially U-shaped conveyor duct having a bottom wall, a substantially horizontal roof, and an input opening extending the full longitudinal extent of said duct, said input opening being defined by the free edges of said bottom wall and said roof, and being arranged to receive a harvested crop; said duct having a closed end and a discharge opening at the other end to deliver the crop to a receiver; said duct having a normally upright longitudinal rear wall extending between said bottom wall and said roof and disposed in facing spaced relation to said input opening; crop collecting means mounted at said input opening and extending throughout the full longitudinal extent thereof, said collecting means projecting at least partially laterally across said input opening to feed a harvested crop into said duct over the full longitudinal extent of said input opening and toward said rear wall; conveyor means extending substantially perpendicularly through said rear wall into said duct so as to offer minimum resistance to loading of said duct by said collecting means; drive means operable to move said conveyor means longitudinally of said rear wall to effect partial compacting, between said bottom wall, said roof and said rear wall, of the crop located in said duct, and movement of the partially compacted crop along a path defined by said bottom wall, said roof and said rear wall, and partly by said collecting means, and, without change in the direction of travel of the partially compacted crop, through said discharge opening to a receiver; and means mounting said device for movement in a travel direction substantially normal to the longitudinal extent of said input opening; said duct roof extending upwardly in the direction toward said discharge opening.

* * * * *